United States Patent
Lewis

(10) Patent No.: US 7,185,485 B2
(45) Date of Patent: Mar. 6, 2007

(54) METHOD AND SYSTEM FOR FAILURE ACCOMMODATION OF GAS GENERATOR FUEL METERING SYSTEM

(75) Inventor: Steven A. Lewis, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 315 days.

(21) Appl. No.: 10/802,368

(22) Filed: Mar. 17, 2004

(65) Prior Publication Data

US 2005/0050897 A1 Mar. 10, 2005

Related U.S. Application Data

(60) Provisional application No. 60/473,916, filed on May 29, 2003.

(51) Int. Cl.
*F02K 3/10* (2006.01)
(52) U.S. Cl. .......................... 60/243; 60/764
(58) Field of Classification Search ............ 60/39.281, 60/243, 734, 764
See application file for complete search history.

(56) References Cited

U.S. PATENT DOCUMENTS

| | | | |
|---|---|---|---|
| 2,847,821 A * | 8/1958 | Brown | 60/764 |
| 2,851,857 A | 9/1958 | Jones | |
| 2,969,109 A * | 1/1961 | Card | 60/764 |
| 4,422,289 A | 12/1983 | Langton | |
| 4,656,827 A | 4/1987 | Puillet | |
| 4,827,714 A * | 5/1989 | Miles | 60/764 |
| 4,969,444 A | 11/1990 | Zagranski et al. | |
| 5,709,079 A | 1/1998 | Smith | |
| 6,237,324 B1 | 5/2001 | Smith | |
| 6,381,946 B1 | 5/2002 | Wernberg et al. | |
| 6,487,847 B1 | 12/2002 | Snow et al. | |
| 2002/0078692 A1 | 6/2002 | Jay et al. | |

* cited by examiner

*Primary Examiner*—L. J. Casaregola
(74) *Attorney, Agent, or Firm*—Birch, Stewart, Kolasch & Birch, LLP

(57) ABSTRACT

An apparatus for providing a backup fuel metering system for the gas generator section (24) of a gas turbine engine (10) is disclosed that includes a gas generator (24) and an augmentor (40). The apparatus includes a gas generator fuel metering system (52) providing fuel to the gas generator nozzles (32) and an augmentor fuel metering system (54) providing fuel to an augmentor (40). The augmentor fuel system (54) includes a diverter valve (88) which selectably directs fuel to the augmentor (40) during augmentation operation or to the gas generator nozzles (32) during a gas generator metering system failure or critical engine operation. The system allows the gas generator nozzles (32) to be supplied with fuel flow from the gas generator metering system (52), the augmentor metering (54) system or both. When the gas generator nozzles (32) are being supplied with flow from both metering systems the system is capable of improved fault accommodation.

18 Claims, 7 Drawing Sheets

METHOD AND SYSTEM FOR FAILURE ACCOMMODATION OF GAS GENERATOR FUEL METERING SYSTEM

CROSS REFERENCE TO RELATED APPLICATIONS

The present application claims the benefit of U.S. Provisional Patent Application No. 60/473,916 filed May 29, 2003, the entire contents of which are hereby incorporated by reference.

This invention was made with Government support under Contract No. N00019-02-C-3003 awarded by the United States Navy. The Government has certain rights in this invention.

FIELD OF THE INVENTION

The present invention is directed toward a method and system for accommodating failures of a gas generator fuel metering system, and, more specifically, toward a method and system for selectively providing a gas generator with a secondary metered fuel supply.

BACKGROUND OF THE INVENTION

Gas turbine engines, such as those found on jet aircraft, comprise a housing within which fuel and air are combined and burned. The resulting hot exhaust gasses are used to turn a turbine and provide thrust when they exit the housing. Such engines generally include a fan to draw air into the housing and a compressor that compresses the air and sends it to a gas generator. Here a precisely metered supply of fuel is mixed with the compressed air and burned. The expanding exhaust gasses turn a turbine which powers at least the compressor and the fan. The exhaust gasses then pass through the remainder of the housing and exit the housing to provide thrust.

Such engines sometimes include sections called "afterburners" or "thrust augmentors" or merely "augmentors" that allow a gas turbine engine to produce additional thrust for limited periods of time—to help an aircraft take-off, or during critical military maneuvers, for example. Augmentors may comprise a set of fuel nozzles located in a chamber downstream from the gas generator in which chamber additional fuel is burned to increase engine thrust. Augmentor nozzles may receive fuel over a different supply path than the supply path used to provide fuel to the gas generator. Thus, the use of the augmentor does not reduce fuel supplied to the gas generator.

The supply of fuel to the gas generator must be metered very precisely and maintained substantially continuously to ensure reliable engine operation. Therefore, on many gas turbine engines it is desirable to have a backup system to provide a metered flow of fuel to the gas generator to allow continued engine operation in the event of a primary fuel metering system failure. Typically these backup systems are implemented by added redundant parts and control transfer systems.

For some critical gas turbine engine operating conditions, the gas generator fuel flow metering system should be able to accommodate a failure with minimal impact to the metered flow. In some aircraft systems, it has been determined that a reduction in fuel flow of 20% for more than 70 ms will result in loss of the aircraft. Achieving this level of failure accommodation with an active/standby system is extremely difficult. Even typical active/active approaches, using two servo valves to control one metering, can not achieve this fault accommodation without extreme measures that add a substantial weight and cost to the system.

SUMMARY OF THE INVENTION

According to one aspect of the present invention, a gas generator fuel metering system selectively utilizes a split flow active/active arrangement using two metering systems, both providing half the desired flow to the gas generator. Fault accommodation is provided by the normal loop closure of the system and does not require extremely fast fault detect times.

According to one embodiment of the present invention, the gas generator fuel metering system uses a fuel metering zone from an augmentor fuel control to provide backup and split flow functions for the primary gas generator metering system. In one implementation, the split flow operation is selectively activated for use during failure critical engine operating conditions.

Numerous other options are available to make use of this approach, including providing two metering systems for primary metering, each using half of the flow for normal operation. In one embodiment, a valve is added to the outlet of one zone of a multi-zone augmentor to divert the metered flow to either the Augmentor Fuel Control (AFC) zone or to the Gas Generator (GG) zone. The flow exiting the AFC diverter valve ties into the GG burn flow pipe down stream of the Main fuel control GG shutoff valve. Both the AFC zone and the Main fuel control GG zone maintain independent shutoff valves that provide drip tight shutoff. This system allows the GG nozzles to be provided with flow from either the AFC metering valve, Main fuel control metering valve, or both. For typical engine/aircraft operation, the flow to the GG nozzles would be provided by the Main fuel control metering valve. For failure critical GG operation, the GG flow would be supplied by both the AFC and the Main fuel control with half of the flow provided by each.

According to an embodiment of the present invention, the existing AFC metering system is used to backup the primary GG metering system. This provides a completely independent gas generator backup system at a lower weight and cost than what is typically associated with gas generator backup systems.

According to another aspect of the present invention, a fuel system is provided for a gas turbine engine that has a gas generator and an augmentor. A gas generator fuel system supplies fuel to the gas generator and includes a first fuel line with a first fuel metering valve, and an augmentor fuel system provides fuel to the augmentor and has a second fuel line with a second metering valve. A diverter valve in the second fuel line selectively diverts fuel from the second fuel line to the first fuel line.

An additional aspect of the invention comprises a method of providing a secondary fuel supply to the gas generator of a gas turbine engine. The engine includes a first metering valve metering fuel to the gas generator and a second metering valve metering fuel to the augmentor. In this method, a diverter valve is provided downstream from the second metering valve and used for selectively diverting fuel from the second metering valve to the gas generator.

A further aspect of the present invention comprises a method of providing a secondary fuel supply to the gas generator section of a gas turbine engine that has a gas generator section and an augmentor section. In such an engine, a first fuel line delivers fuel in a downstream direction through a first metering valve and a first shutoff valve to the gas generator section. A second fuel line delivers fuel in a downstream direction through a second metering valve and a second shutoff valve to the augmentor section. The method involves providing a diverter valve in the second fuel line downstream of the second metering valve, connecting the diverter valve to the first fuel line downstream of the first shutoff valve, monitoring a condition of the first metering valve, and controlling the amount of fuel diverted from the second fuel line to the first fuel line in response to the monitored condition.

In another aspect, the invention comprises a fuel system for an aircraft gas turbine engine that has a gas generator section and an augmentor section. The fuel system comprises a fuel supply, a boost pump that draws fuel from the fuel supply, a gas generator fuel system connected to the boost pump and an augmentor fuel system connected to the boost pump. The gas generator fuel supply includes a first fuel pump, a first nozzle directed into the gas generator section, a fuel line delivering fuel in a downstream direction from the fuel pump to the first nozzle, a first metering valve in the first fuel line upstream from the first nozzle and a first shutoff valve in the first fuel line between the first metering valve and the nozzle. The augmentor fuel supply comprises a second fuel pump, second and third nozzles directed into the augmentor section and a second fuel line, comprising first and second branches, delivering fuel in a downstream direction from the second fuel pump to the second and third nozzles. There is a second metering valve in the second fuel line first branch upstream of the second nozzle and a second shut-off valve in the second fuel line first branch between the second metering valve and the second nozzle. There is also a third metering valve in the second fuel line second branch upstream of the third nozzle and a third shut-off valve in the second fuel line second branch between the third metering valve and the third nozzle. The fuel system further includes a diverter valve in the second fuel line downstream of the second metering valve and an auxiliary fuel line connected between the diverter valve and the first fuel line. A controller controls the first metering valve, the second metering valve and the diverter valve, and causes the first metering valve to deliver a precisely controllable amount of fuel to the gas generator. The controller also controls the amount of fuel diverted by the diverter valve into the auxiliary fuel line.

BRIEF DESCRIPTION OF THE DRAWINGS

Referring now to the drawings, wherein the showings are for the purpose of illustrating several embodiments of the invention only and not for the purpose of limiting same.

DESCRIPTION OF THE INVENTION

Figure 1:
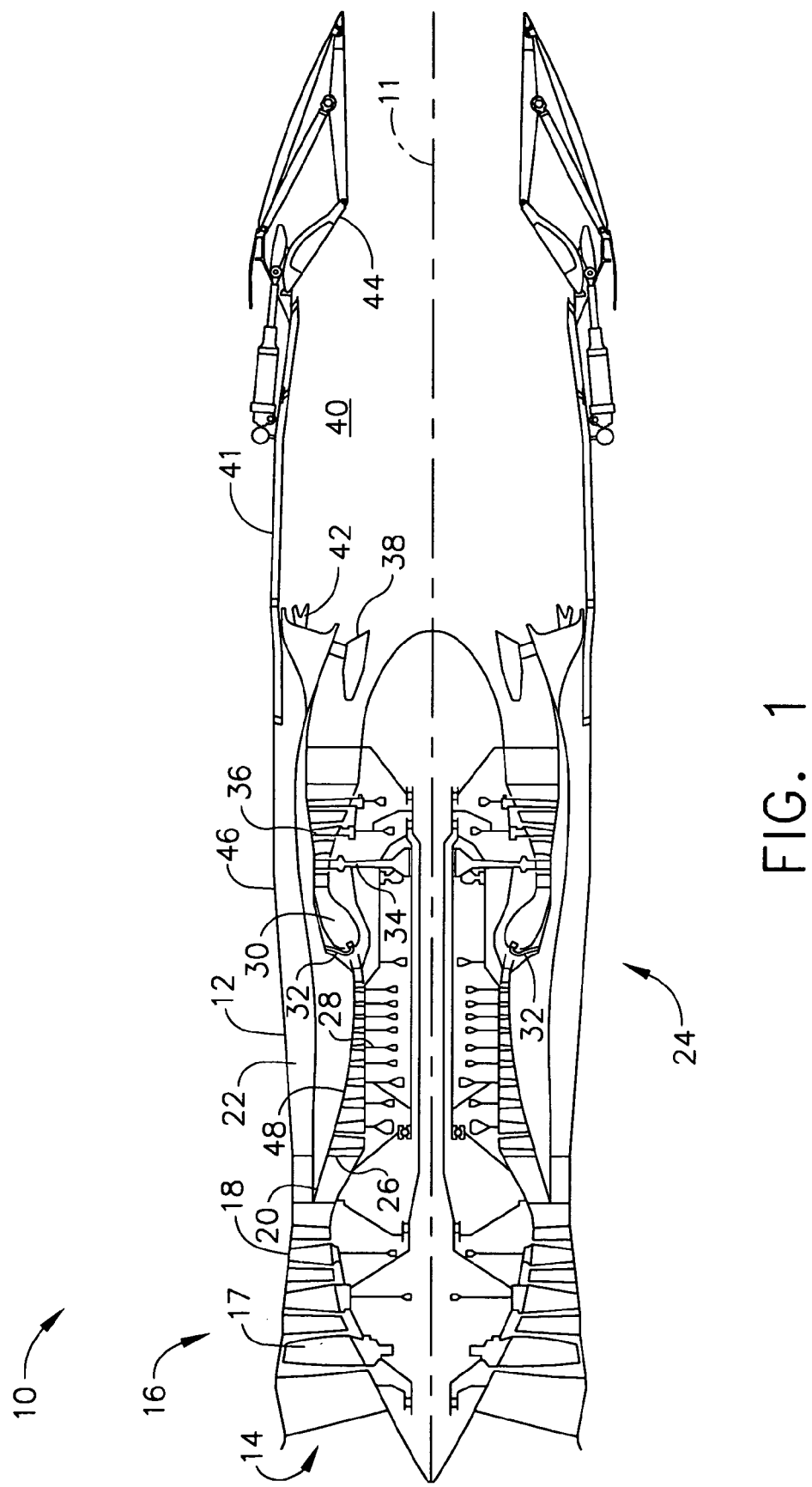
FIG. 1 is a longitudinal, cross-sectional view of an aircraft gas turbine engine having a gas generator and an augmentor.

Referring now to the drawings, wherein the showings are for the purpose of illustrating embodiments of the invention only and not for the purpose of limiting same, FIG. 1 is a longitudinal cross-sectional view of an aircraft gas turbine engine 10 surrounded by an annular outer casing 12 that encloses the several components of the engine. Engine 10 has a longitudinal axis 11, about which several rotating components of the engine rotate. An air inlet 14 is provided into which air is drawn to enter a fan section 16 within which the pressure and the velocity of the inlet air are increased. Fan section 16 includes a multiple-stage fan 17 that is enclosed by a fan casing 18.

Fan outlet air that exits from fan 17 passes an annular divider 20 that divides the fan outlet air stream into a bypass airflow stream and a gas generator airflow stream. The bypass airflow stream flows into and through an annular bypass duct 22 that surrounds and is spaced outwardly from gas generator 24. The gas generator airflow stream flows into an annular inlet 26 of gas generator 24.

Gas generator 24 includes an axial-flow compressor 28 that is positioned downstream of inlet 26 and that serves to further increase the pressure of the air that enters inlet 26. High-pressure air exits compressor 28 and enters an annular combustion chamber 30 into which fuel is injected from a source of fuel (not shown) through a plurality of circumferentially-spaced fuel nozzles 32. The fuel-air mixture is ignited to increase the temperature of, and thereby add energy to, the pressurized air that exits compressor 28. The resulting high temperature combustion products drive a first high-pressure turbine 34 that drives compressor 28. After exiting high-pressure turbine 34 the combustion products enter a second, low-pressure turbine 36 that drives fan 17. The combustion products that exit low-pressure turbine 36 flow into and through an augmentor 40 that is enclosed by a tubular casing 41, and mix with bypass air that enters augmentor 40 from bypass duct 22. The gas generator mass flow of air and combustion products, and the bypass airflow, together exit engine 10 through exhaust nozzle 44, which, as shown, is a converging-diverging nozzle, to provide propulsive thrust.

When engine 10 is used in an augmented mode, additional fuel is introduced into the gas generator combustion products at a point downstream of low-pressure turbine 36. Fuel is also introduced into the bypass air stream at substantially the same position along engine longitudinal axis 11. Flameholders 38 and 42 are provided in the gas generator flow stream and in the bypass flow stream, respectively, to stabilize the flame fronts thereby produced in each of the main and bypass flow streams.

Figure 2:
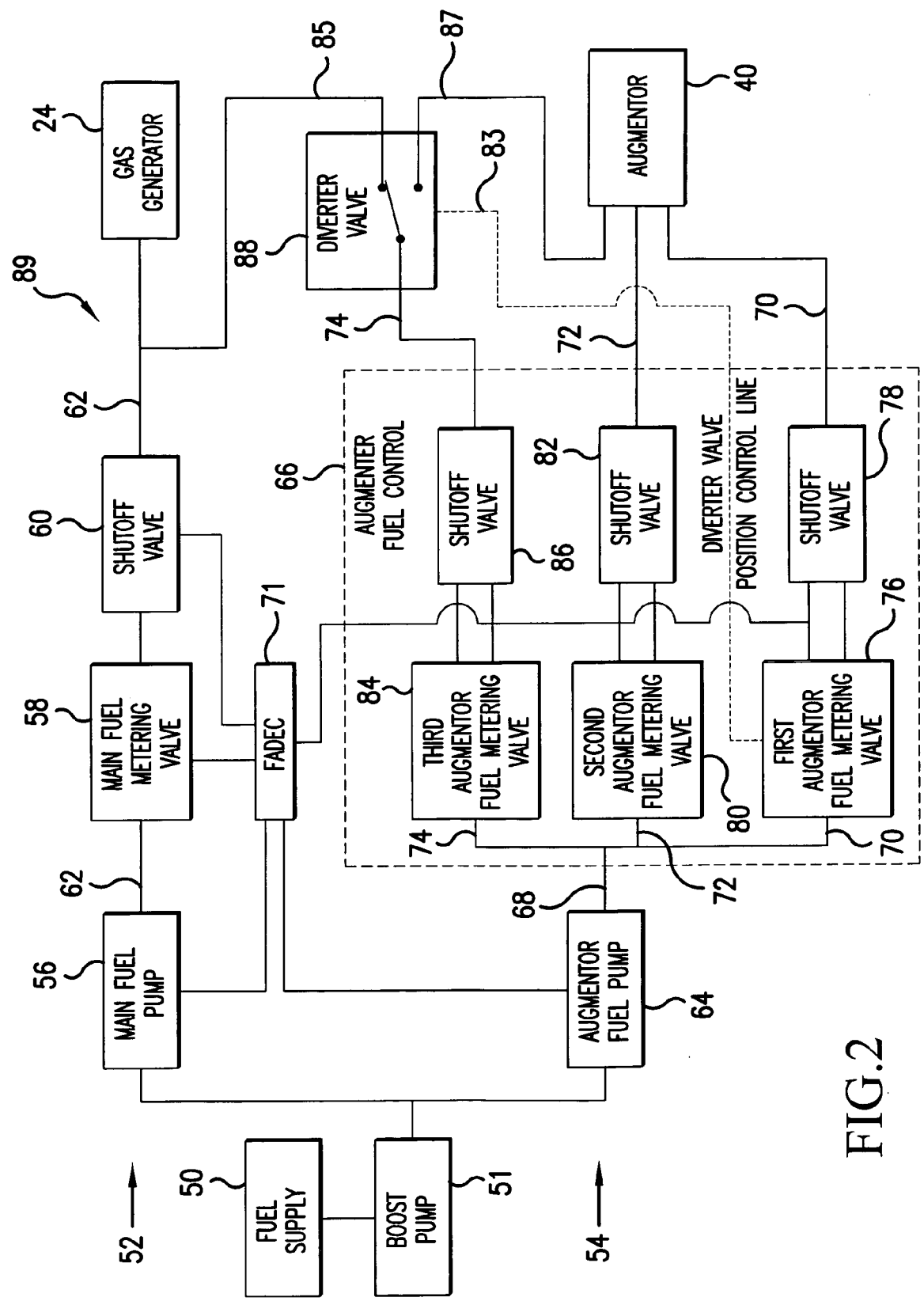
FIG. 2 schematically shows a fuel system for the gas turbine engine of FIG. 1.

FIG. 2 schematically shows a fuel system for supplying fuel to gas generator 24 and to augmentor 40. The fuel system includes a fuel supply 50 supplying fuel via a boost pump 51 to a main fuel system 52 which main fuel system 52 supplies fuel to gas generator 24 and an augmentor fuel system 54 supplying fuel to augmentor 40. As used herein, the term "downstream" refers to the direction of fuel flow from fuel supply 50 toward either gas generator 24 or augmentor 40.

Main fuel system 52 comprises a main fuel pump 56, a main fuel metering valve 58, and a main fuel shutoff valve 60 all interconnected and connected to gas generator 24 by a first fuel line 62. Augmentor fuel system 54 comprises an augmentor fuel pump 64 and an augmentor fuel control 66 connected by a second fuel line 68. Within augmentor fuel control 66, second fuel line 68 spits into three branches, a first branch 70, a second branch 72 and a third branch 74 each of which provides fuel to first, second, and third augmentation zones in augmentor 40. Fuel is supplied to augmentor 40 via these branches 70, 72, 74, through one, two or three sets of nozzles 42 depending on the amount of additional thrust needed.

First branch 70 includes a first fuel metering valve 76 and a first zone shutoff valve 78; second branch 72 includes a second fuel metering valve 80 and a second zone shutoff valve 82; and third branch 74 includes a third fuel metering valve 84 and a third zone shutoff valve 86. A controller, such as FADEC 71 (Full Authority Digital electronic Engine Control), is operatively connected to and controls the operation of the fuel pumps 56, 64, metering valves 58, 76, 80, 84 and shutoff valves 60, 78, 82, 86.

Augmentors such as augmentor 40 consume fuel at a much faster rate than a gas generator. Therefore, they are generally only used in short bursts when unusual levels of thrust are needed. Typical use is on the order of 20 to 40 seconds. During other times, the augmentor fuel system 54 remains unused. However, augmentor fuel systems generally include many of the same elements that are present in a primary fuel system, including one or more metering valves and a fuel pump.

It is desirable to provide an auxiliary metering valve as a backup for the main fuel metering valve; however, the provision of such an auxiliary valve adds to the cost and complexity of the fuel delivery system. The present inventors have determined that, with appropriate modifications to the fuel delivery system, an augmentor metering valve can advantageously function both as an augmentor fuel metering valve and an auxiliary valve for the primary fuel system. This reduces the need for a dedicated backup main fuel metering valve. If a dedicated backup main fuel metering valve is used, a third layer of redundancy is provided.

In view of the above, an embodiment of the present invention includes a diverter valve 88 that controllably diverts fuel from the third branch 74 of augmentor fuel line 68 to main fuel system 52 via fuel line 85 which connects to main fuel line 62 at a point 89 downstream from main fuel shutoff valve 60. Diverter valve 88 is also connected to augmentor 40 by fuel line 87. Because diverter valve 88 is located downstream from third augmentor metering valve 84, the fuel supplied from the augmentor fuel system to the main fuel system is accurately metered by third augmentor fuel metering valve 84 even in the event of a malfunction of main fuel metering valve 58.

When augmentor fuel system 54 is used to provide fuel to augmentor 40, the first, second and third augmentor metering valves 76, 80 84 are actuated sequentially, in that order, depending on the amount of additional fuel required. These metering valves are shut off in the reverse order: third valve 84, second valve 80, first valve 76. Therefore, when first augmentor metering valve 76 is shut off, the augmentor is inactive. Because of this arrangement, the state of first augmentor metering valve 76 is used to control the condition of diverter valve 88 via control line 83. When first augmentor metering valve 76 is in the non-flowing position, the diverter valve 88 is open to main fuel line 62. Controller 71 then controls third augmentor metering valve 84 to controllably deliver augmentor fuel to the main fuel line 62. This arrangement allows diverter valve 88 to be controlled without being directly connected to controller 71, thereby simplifying the wiring arrangement.

The above described system is operable in one of two modes, an active/passive mode and an active/active mode, each of which is described below. In a first mode of operation, all fuel required by gas generator 24 is supplied through main fuel metering valve 58, and FADEC 71 monitors the position of this valve. If main fuel metering valve 58 malfunctions, failing open or failing closed, for example, FADEC 71 closes main fuel shutoff valve 60, opens diverter valve 88 by moving first augmentor metering valve 76 to the non-flowing position and causes third augmentor fuel metering valve 84 to deliver the required amount of fuel to first fuel line 62. In the event of such a failure, FADEC 71 also controls valve 80 in augmentor fuel control 66 to prevent it from delivering fuel to augmentor 40. Thus, when augmentor fuel is delivered to main fuel line 62, the augmentor 40 cannot be used. This mode of operation is active/passive. The main fuel system actively provides all the needs of the gas generator 24 and augmentor fuel system 54 remains passive until needed. Augmentor 40 is available for use as long as the main fuel system is meeting the fuel needs of gas generator 24.

In a second mode of operation, diverter valve 88 is controlled to connect augmentor fuel line 68 to first fuel line 62, and FADEC 71 causes each of main fuel metering valve 58 and augmentor third zone fuel metering valve 84 to supply approximately one half the fuel required by gas generator 24. FADEC 71 monitors the positions of both metering valves 58, 84 and, in the event that one of these valves fails, the other can be controlled to supply the entire fuel needs of gas generator 24. For example, if main fuel metering valve 58 fails, third augmentor fuel metering valve 84 is already supplying one half the fuel needs of gas generator 24 and flow therethrough can be increased from 50 to 100 percent more rapidly than it could be increased from 0 to 100 percent. This mode of operation may be referred to as active/active because both fuel systems 52, 54 actively provide fuel under normal operating conditions. This active/active approach may be desirable in certain failure critical modes of aircraft operation. For example, in short take-off vertical landing (STOVL) and similar modes of operation the ability to recover quickly from a failure may be highly desirable. Augmentor 40 cannot be used in this second mode of operation, but when rapid failure recovery is more desirable than augmentor availability, this mode may be preferred.

Figure 3:
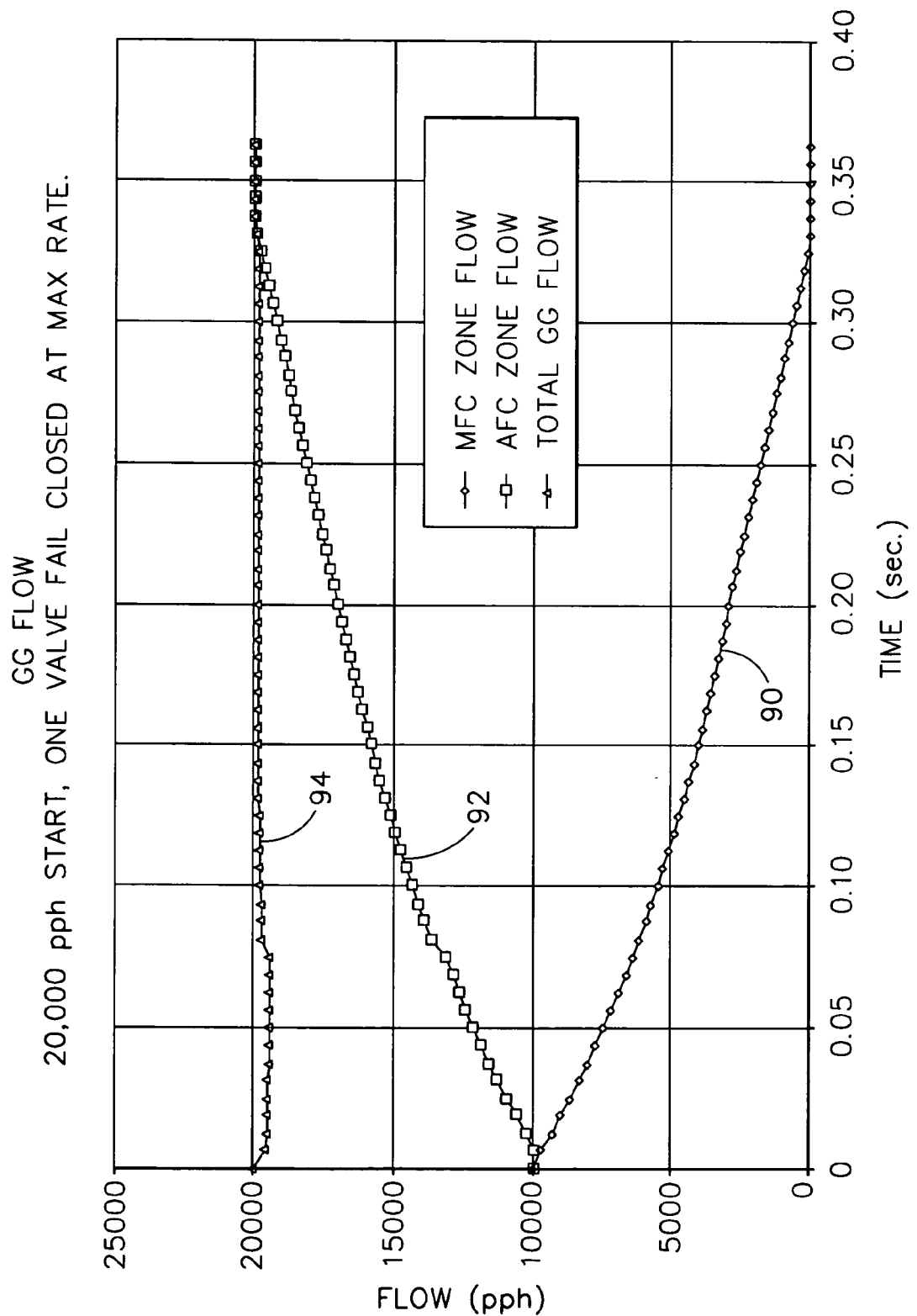
FIG. 3 is a graph illustrating how the amounts of fuel supplied by the main fuel system and the augmentor fuel system vary in response to a metering valve failing closed under a first operating condition.

FIGS. 3–7 illustrate recovery times for various system failures under various operating conditions when the present system is used in the active/active mode. FIG. 3 illustrates a first operating condition under which fuel is supplied to gas generator 24 at 20,000 pounds per hour (pph). Approximately 10,000 pph is provided by each of the main fuel metering valve 58 and third augmentor fuel metering valve 84. Line 90 on the graph of FIG. 3 represents the fuel flow rate through main fuel metering valve 58, line 92 represents the fuel flow rate through third augmentor fuel metering valve 84, and line 94 represents the total fuel provided to the gas generator through metering valves 58 and 84. FIG. 3 illustrates a failure of main fuel metering valve 58 under these operating conditions. As illustrated, main fuel metering valve 58 fails closed at time 0 at maximum rate, cutting off all fuel flow therethrough in about one third second. As will be appreciated from line 94, showing total fuel flow, however, augmentor fuel metering valve 68 quickly makes up for the drop in fuel supplied by main fuel metering valve 58. The total fuel supplied to gas generator 24 drops by about five percent or less for the first 75 microseconds after valve failure, but within 75 microseconds, before the main fuel metering valve has closed completely, the total fuel rate has returned to 20,000 pph.

The above description represents a complete and rapid failure of main fuel metering valve 58. It would appear that a failure of main fuel metering valve 58 at less than maximum rate could be accommodated with even less variation in the fuel supply. For example, if main fuel metering valve 58 failed in a manner that reduced fuel flow by ten percent, FADEC 71 would detect the fault and cause third augmentor metering valve 84 to make up for the decreased flow. Shutoff valve 60 could then be closed in a controlled manner to allow for a more gradual shutoff of the main fuel supply and a gradual ramping up of the augmentor fuel supply (gradual being over the course of 0.5 to 2.0 seconds, for example).

Figure 4:
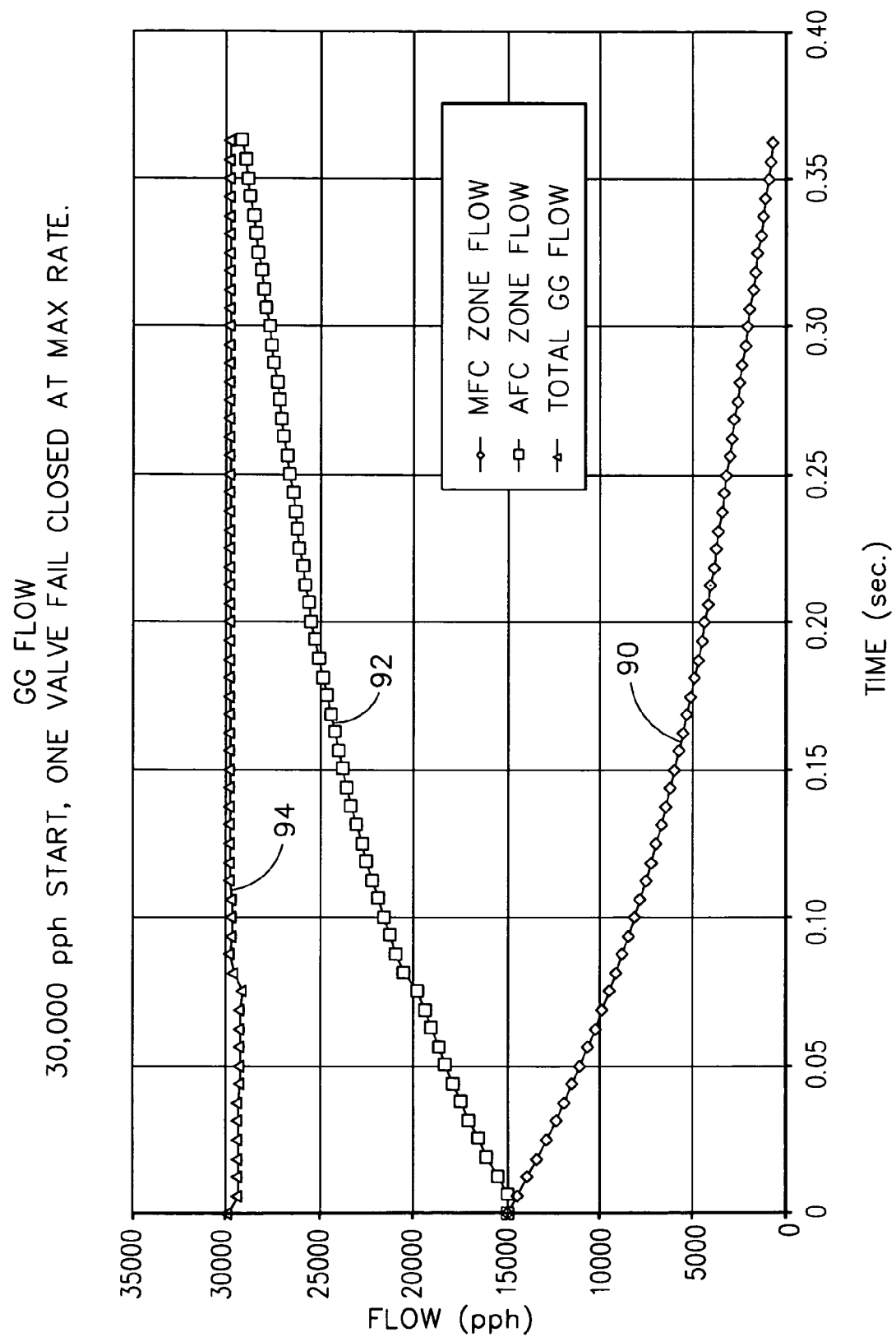
FIG. 4 is a graph illustrating how the amounts of fuel supplied by the main fuel system and the augmentor fuel system vary in response to a metering valve failing closed under a second operating condition.

FIG. 4 illustrates a second operating condition under which fuel is supplied to gas generator 24 at 30,000 pph, about 15,000 pph through each of metering valves 58, 84. Here, main fuel metering valve fails closed at a maximum rate. As before, a small, brief drop in total fuel supply shown by line 94 is accommodated within about 75 milliseconds, long before the main fuel metering valve has completely failed shut.

Figure 5:
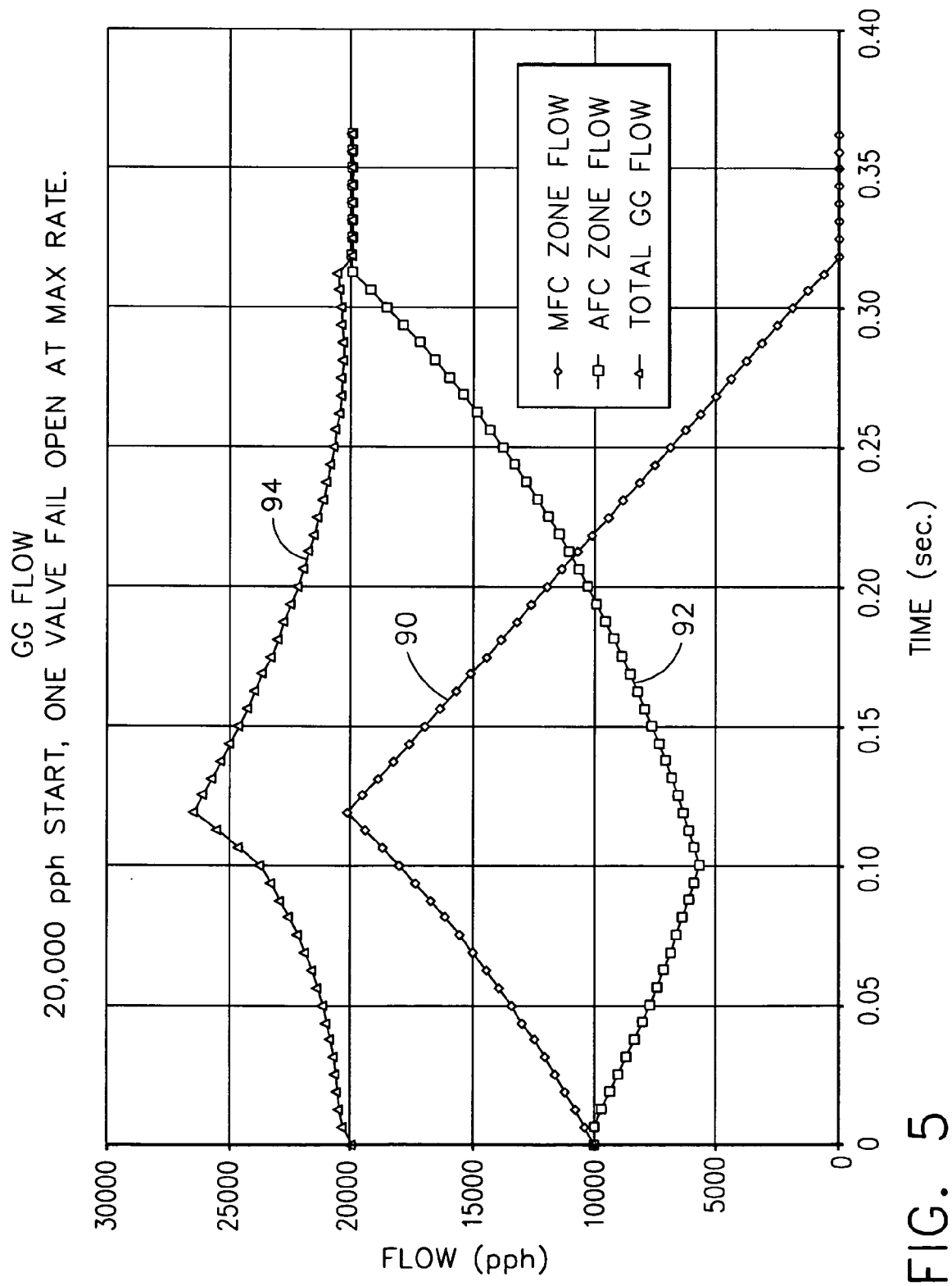
FIG. 5 is a graph illustrating how the amounts of fuel supplied by the main fuel system and the augmentor fuel system vary in response to a metering valve failing open under the first operating condition.
Figure 6:
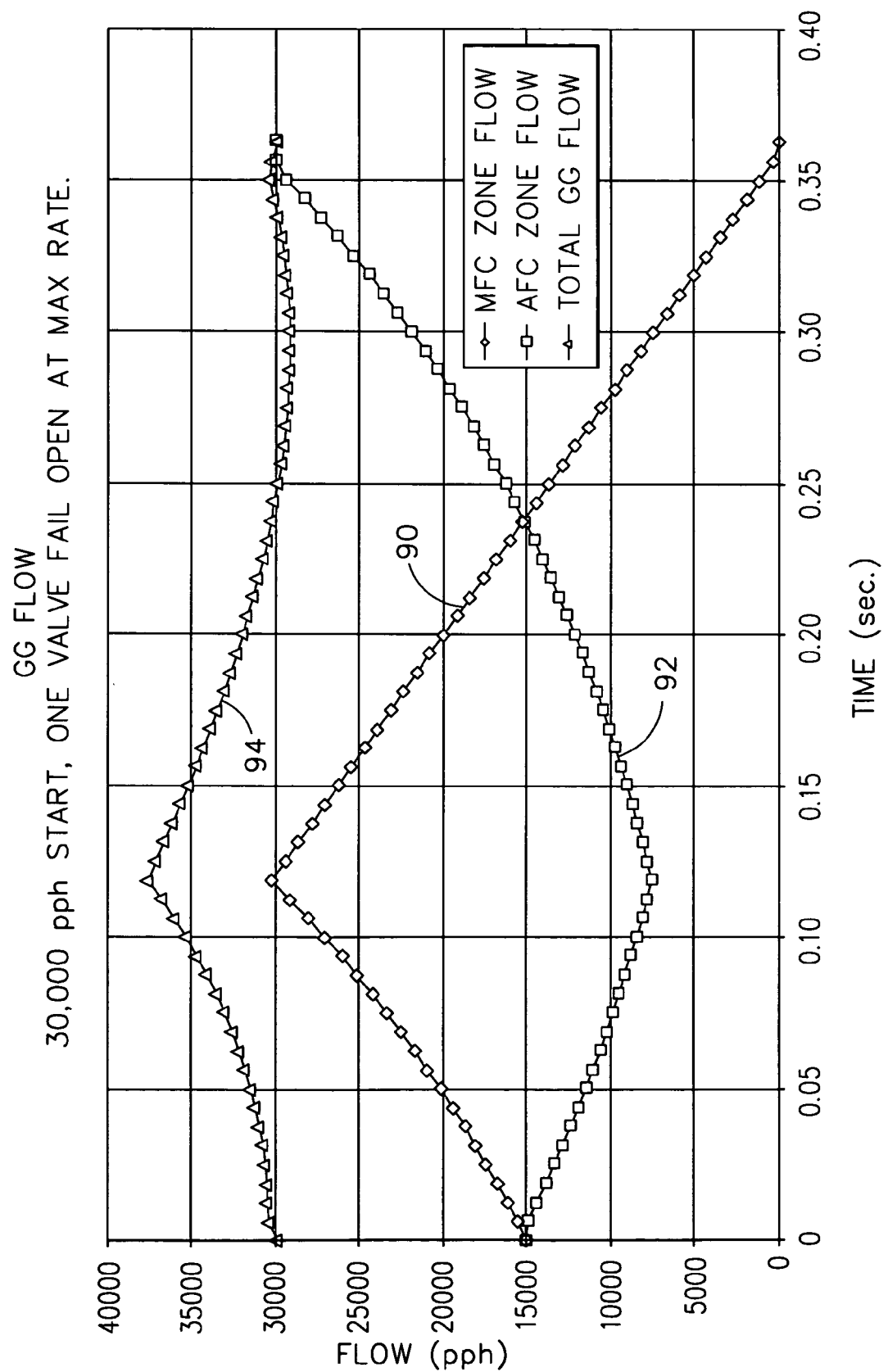
FIG. 6 is a graph illustrating how the amounts of fuel supplied by the main fuel system and the augmentor fuel system vary in response to a metering valve failing open under the second operating condition.

FIG. 5 illustrates a valve failure event under the first operating condition wherein primary fuel metering valve 58 fails open. In this case, the total amount of fuel supplied increases by about 30 percent for a brief period after valve failure, but returns to nearly normal within about a quarter second. FIG. 6 illustrates a valve failing open under the second operating condition and likewise shows rapid fault accommodation. Again, the deviations in total fuel supplied to gas generator 24 are likely to be smaller if the main fuel metering valve fails open or closed at less than its maximum rate.

Figure 7:
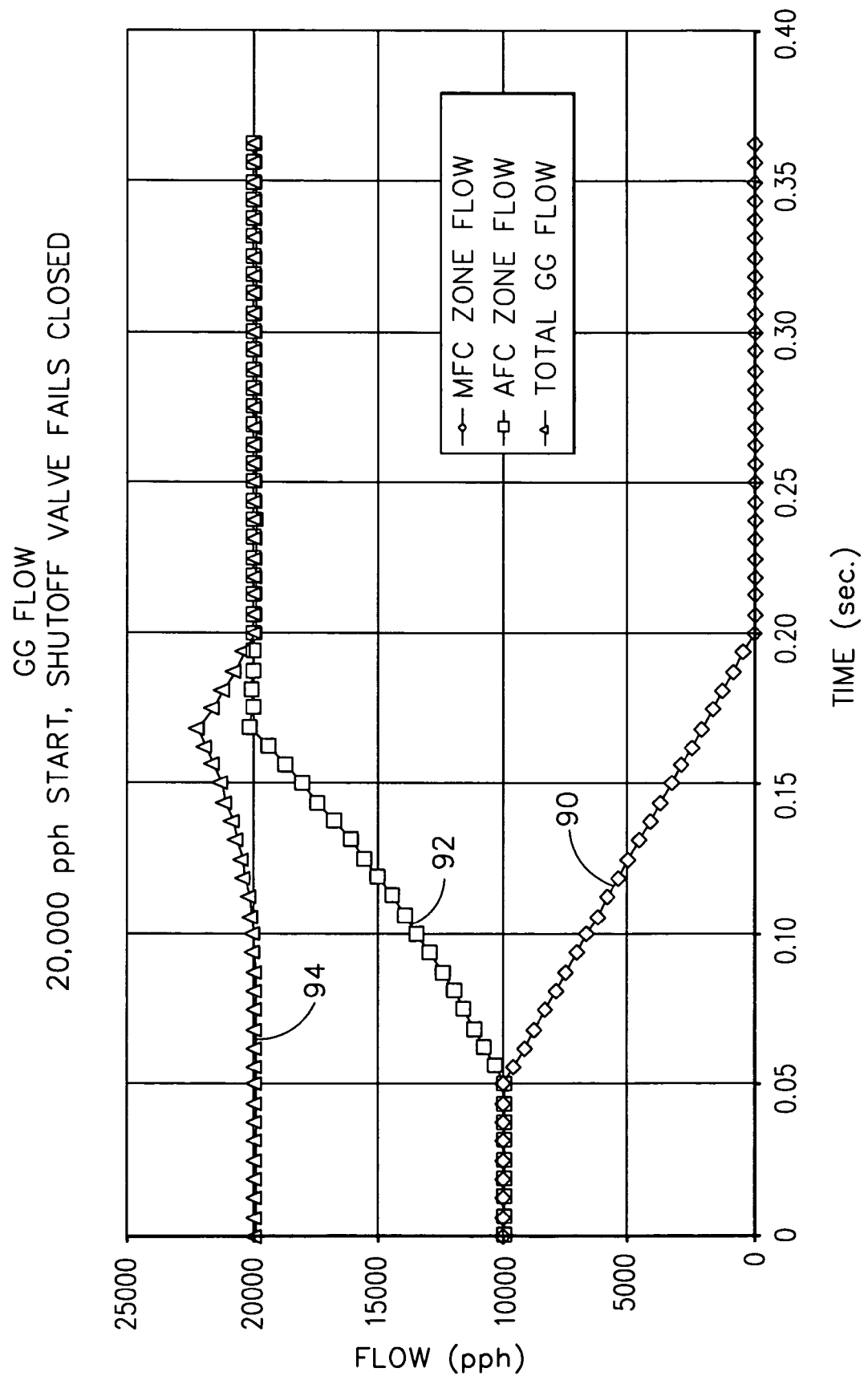
FIG. 7 is a graph illustrating how the amounts of fuel supplied by the main fuel system and the augmentor fuel system vary in response to a shutoff valve failing closed under the first operating condition.

FIG. 7 illustrates a slightly different failure event under the first operating condition that is also accommodated by the method and system of the present invention. FIG. 7 illustrates fuel supplied to gas generator 24 after main fuel shutoff valve 60 fails shut. Shutoff valve 60 fails shut more rapidly than main fuel metering valve 58. However, as shown by line 94, within about 12 milliseconds of closing, the fuel supply to the gas generator is back to the desired rate.

The present invention has been described herein in terms of several embodiments but is limited only by the scope of the claims appended hereto.

What is claimed is:

1. A fuel system for a gas turbine engine including a gas generator and an augmentor located downstream from at least one fuel source comprising:
   a gas generator fuel system comprising a first fuel line and a first fuel metering valve in said first fuel line;
   an augmentor fuel system comprising a second fuel line and a second metering valve in said second fuel line;
   a diverter valve in said second fuel line downstream from said second metering valve; and
   a third fuel line connected between said diverter valve and said first fuel line.

2. The fuel system of claim 1 wherein said third fuel line is connected to said first fuel line downstream of said first metering valve.

3. The fuel system of claim 2 wherein said gas generator fuel system includes a first shutoff valve in said first fuel line downstream of said first fuel metering valve and said augmentor fuel system includes a second shutoff valve in said second fuel line downstream of said second metering valve.

4. The fuel system of claim 2 wherein said third fuel line connects to said first fuel line downstream of said first shutoff valve.

5. The fuel system of claim 3 wherein said diverter valve is located downstream of said second shutoff valve.

6. The fuel system of claim 2 including a controller for controlling said first metering valve and said second metering valve.

7. The fuel system of claim 3 including a controller for controlling said first metering valve, said first shut-off valve, said second metering valve, said second shut-off valve and said diverter valve.

8. The fuel system of claim 6 wherein said controller monitors an operating condition of said first metering valve.

9. The fuel system of claim 6 wherein said diverter valve is positioned to direct fuel to said gas generator during a normal operating condition of the gas turbine engine.

10. The fuel system of claim 6 wherein said diverter valve is positioned to prevent fuel in said diverter valve from reaching said gas generator during a normal operating condition of the gas turbine engine.

11. The fuel system of claim 3 including a controller for controlling said first metering valve and said second metering valve and said diverter valve, wherein said controller, upon detecting a failure of said first metering valve, closes said first shut-off valve and causes said diverter valve to allow an increase fuel flow to said first fuel line.

12. The fuel system of claim 2 wherein said first metering valve and said second metering valve jointly regulate the amount of fuel flowing to said gas generator.

13. The fuel system of claim 12 wherein said controller controls said second metering valve to increase or decrease fuel flow to said gas generator when a decrease or increase in fuel flow through said first metering valve is detected.

14. The fuel system of claim 12 wherein said controller controls said first metering valve and said second metering valve to maintain a substantially constant metered flow of fuel to said gas generator.

15. The fuel system of claim 3 wherein said augmentor fuel system comprises an augmentor fuel control downstream of said augmentor fuel pump comprising a plurality of metering valves controllably delivering fuel to the augmentor, wherein said diverter valve is located downstream of one of said plurality of metering valves controllably delivering fuel to the augmentor.

16. The fuel system of claim 3 wherein said augmentor fuel system comprises an augmentor fuel control downstream of said augmentor fuel pump comprising first and second branches of said second fuel line and first and second metering valves in said first and second branches controllably delivering fuel to said augmentor, wherein said diverter valve is located downstream of said second metering valve and controlled by said first metering valve.

17. A fuel system for an aircraft gas turbine engine including a gas generator section and an augmentor section comprising:
   a fuel supply;
   a boost pump drawing fuel from said fuel supply;
   a gas generator fuel system connected to the boost pump and including a first fuel pump, a first nozzle directed into the gas generator section, a first fuel line delivering fuel in a downstream direction from the fuel pump to the first nozzle, a first metering valve in said first fuel line upstream from said first nozzle and a first shutoff valve in said first fuel line between said first metering valve and said nozzle;

an augmentor fuel system connected to the boost pump and including a second fuel pump, second and third nozzles directed into the augmentor section, a second fuel line comprising first and second branches delivering fuel in a downstream direction from the second fuel pump to the second and third nozzles, a second metering valve in the second fuel line first branch upstream of the second nozzle, a second shut-off valve in said second fuel line first branch between said second metering valve and said second nozzle, a third metering valve in the second fuel line second branch upstream of the third nozzle, a third shut-off valve in said second fuel line second branch between said third metering valve and said third nozzle, a diverter valve downstream of said second metering valve;

an auxiliary fuel line connected between said diverter valve and said first fuel line; and a controller for controlling said first metering valve, said second metering valve and said third metering valve, said controller causing said first metering valve to deliver a precisely controllable amount of fuel to said gas generator and controlling the amount of fuel diverted by the diverter valve into the first fuel line.

18. The fuel system of claim 17 wherein said diverter valve is controlled by said third metering valve.

* * * * *